United States Patent
Haensel

(10) Patent No.: US 11,451,379 B2
(45) Date of Patent: Sep. 20, 2022

(54) SEMICONDUCTOR PACKAGE INFORMATION

(71) Applicant: TEXAS INSTRUMENTS INCORPORATED, Dallas, TX (US)

(72) Inventor: Uwe Haensel, Kranzberg (DE)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 17/006,005

(22) Filed: Aug. 28, 2020

(65) Prior Publication Data

US 2022/0069985 A1  Mar. 3, 2022

(51) Int. Cl.
*H04L 9/08* (2006.01)
*G06F 21/73* (2013.01)
*G06V 10/98* (2022.01)
*G06V 30/413* (2022.01)

(52) U.S. Cl.
CPC ............ *H04L 9/0827* (2013.01); *G06F 21/73* (2013.01); *G06V 10/987* (2022.01); *G06V 30/413* (2022.01)

(58) Field of Classification Search
USPC ........ 380/277, 250, 264, 276; 726/2, 21, 36; 713/150, 163, 181
See application file for complete search history.

(56) References Cited

U.S. PATENT DOCUMENTS

| | | | |
|---|---|---|---|
| 2015/0011309 A1* | 1/2015 | Eloff | A63F 13/30 463/29 |
| 2015/0154624 A1* | 6/2015 | Torabi | H04L 67/306 705/14.16 |
| 2015/0170164 A1* | 6/2015 | Marsico | G06Q 30/0201 235/375 |
| 2016/0203352 A1* | 7/2016 | Marsico | G06K 7/1417 235/375 |
| 2016/0350624 A1* | 12/2016 | Liguori | B41J 3/46 |
| 2019/0156167 A1* | 5/2019 | Singh | G06K 19/06037 |
| 2020/0004227 A1* | 1/2020 | Kang | H04W 12/08 |
| 2020/0349510 A1* | 11/2020 | Dhonde | G06K 7/1413 |

* cited by examiner

*Primary Examiner* — Sharif E Ullah
(74) *Attorney, Agent, or Firm* — Michelle F. Murray; Charles A. Brill; Frank D. Cimino

(57) ABSTRACT

In examples, a non-transitory computer-readable storage medium stores executable code, which, when executed by a processor, causes the processor to receive a semiconductor package image, the image including semiconductor package surface codes, the codes including a semiconductor package identifier. The executable code causes the processor to transmit at least one of the semiconductor package identifier, the codes, or the image. The executable code causes the processor to receive information associated with the semiconductor package identifier. The executable code causes the processor to output the information via at least one of a display coupled to the processor, a speaker coupled to the processor, or the wireless transceiver.

14 Claims, 5 Drawing Sheets

SEMICONDUCTOR PACKAGE INFORMATION

SUMMARY

In examples, a non-transitory computer-readable storage medium stores executable code, which, when executed by a processor, causes the processor to receive a semiconductor package image, the image including semiconductor package surface codes, the codes including a semiconductor package identifier. The executable code causes the processor to transmit at least one of the semiconductor package identifier, the codes, or the image. The executable code causes the processor to receive information associated with the semiconductor package identifier. The executable code causes the processor to output the information via at least one of a display coupled to the processor, a speaker coupled to the processor, or the wireless transceiver.

In examples, a method includes receiving data by an electronic device via a network, the data including at least one of a semiconductor package image, semiconductor package surface codes, a semiconductor package identifier from the codes, or a manufacturing lot number from the codes. The method includes receiving, by the electronic device, a security key. The method includes using, by the electronic device, the data to obtain semiconductor package information from a database. The method includes transmitting, by the electronic device, the information via the network in response to a verification of the security key.

BRIEF DESCRIPTION OF THE DRAWINGS

For a detailed description of various examples, reference will now be made to the accompanying drawings in which.

DETAILED DESCRIPTION

Figure 1:
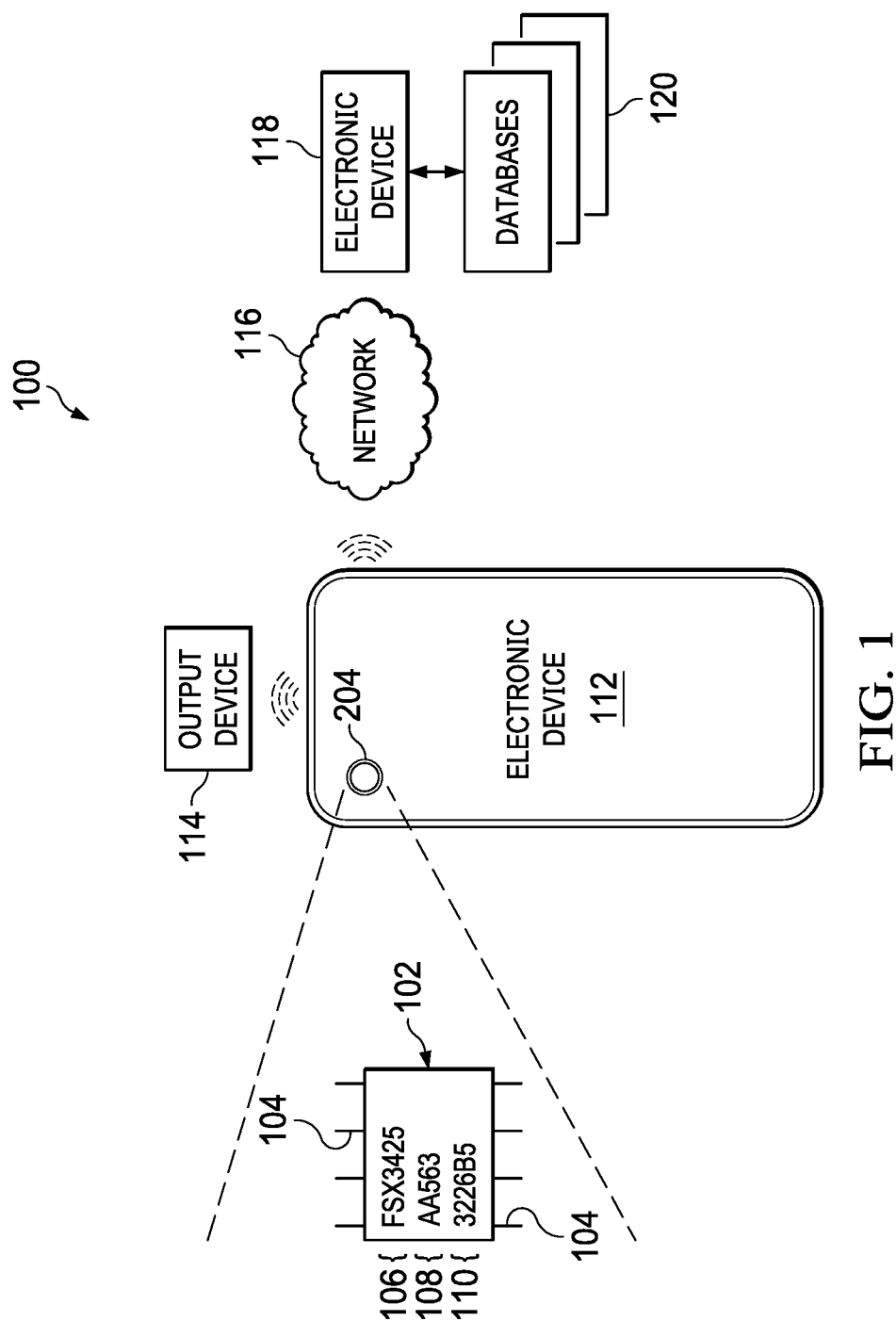
FIG. 1 is a schematic block diagram of a system for accessing semiconductor package information using images, in accordance with various examples.

During manufacture, semiconductor chips (also commonly referred to as "dies") are frequently mounted on die pads of lead frames and are wire-bonded, clipped, or otherwise coupled to leads of the lead frame. Other devices may similarly be mounted on the die pad or on another lead frame pad. The assembly is later covered by a mold compound (e.g., epoxy) to protect the assembly from potentially damaging heat, physical trauma, moisture, and other deleterious factors. After detachment from its lead frame strip, the finished assembly is called a semiconductor package or, more simply, a package. The conductive terminals (e.g., leads) are exposed to an exterior of the package and are used to electrically couple the packaged chip to devices outside of the package.

Electronic devices such as semiconductor packages are frequently marked with identifying information. For example, the mold compound of a semiconductor package may be engraved (e.g., laser engraved) with a logo of the chip designer or manufacturer, a manufacturing lot number, a semiconductor package identifier (e.g., model number), and various other types of information. Such information can be useful to various entities in the supply chain during and after manufacture. For example, a user of a semiconductor package may use the semiconductor package identifier to access specifications (e.g., pinout diagrams), troubleshooting information, and other useful data regarding the semiconductor package.

Accessing such information regarding the semiconductor package, however, can be tedious and difficult. In many cases, a user of the semiconductor package may have to locate a computer to access the information. Locating the information on the Internet can be a challenge, as information regarding various semiconductor packages can be outdated, inaccurate, or missing. Contacting the designer or manufacturer for assistance can be time-consuming and frustrating for the user. In addition, providing personnel to field such calls for assistance can be time-consuming and expensive for the designer or manufacturer of the semiconductor package.

This disclosure describes various examples of a system in which an electronic device, for example a smartphone, is usable to obtain an image of codes marked (e.g., laser-engraved) on another electronic device, which in this description is assumed to be a semiconductor package. The smartphone identifies one or more of the codes in the image and uses the code(s) to automatically access information regarding the semiconductor package from the semiconductor package designer or manufacturer. For example, the smartphone uses the code(s) when contacting a server maintained by the designer or manufacturer to access various types of information regarding the semiconductor package. In addition, the smartphone may use the code(s) to establish an interactive troubleshooting session with the designer or manufacturer, for example, with an artificial intelligence (AI)-enabled server maintained by the designer or manufacturer. In examples, the smartphone may provide a security key or other identifying information to the server to mitigate the possibility of corporate espionage by a competitor of the designer or manufacturer. Upon obtaining semiconductor package information from the server, the smartphone presents the information to a user via a display or other suitable output device. Although this disclosure primarily describes the various examples in the context of a semiconductor package and a smartphone, the scope of this disclosure is not limited to these particular devices. Examples described herein contemplate the use of any suitable electronic device in lieu of a semiconductor package and any suitable electronic device in lieu of a smartphone. These and other examples are now described with reference to FIGS. 1-7.

FIG. 1 is a schematic block diagram of a system 100 for accessing semiconductor package information using images, in accordance with various examples. In examples, the system 100 includes a semiconductor package 102. As explained above, the scope of this disclosure is not limited to semiconductor packages, and any suitable electronic device having an identifying mark(s) may be substituted for the semiconductor package 102. For purposes of this description, however, a semiconductor package is assumed. The semiconductor package 102 includes a plurality of conductive terminals 104. Such conductive terminals 104 may also be referred to as pins or leads. The semiconductor package 102 depicted in FIG. 1 is, for instance, a gullwing-style leaded package, such as a dual inline package (DIP), but in other examples, other types of semiconductor packages 102 may be used. For instance, quad flat no lead (QFN) packages may be used. The semiconductor package 102 is marked with a semiconductor package surface codes 106, 108, 110. Although FIG. 1 depicts a semiconductor package 102 having three codes, fewer or additional codes may be marked on the semiconductor package 102. Each code may be alphanumeric or may include non-alphanumeric symbols, such as those available on a QWERTY keyboard, proprietary symbols (e.g., logos), two-dimensional or three-dimensional barcodes, etc. In the example of FIG. 1, the code 106 is a semiconductor package identifier. A semiconductor package identifier may be a model number of the semiconductor package 102 or may be any suitable identifier that is specific to a semiconductor package having a particular structure and function. In the example of FIG. 1, the code 108 is a code that may be marked on the semiconductor package 102 for any suitable purpose and may be specific to the designer or manufacturer of the semiconductor package 102. In the example of FIG. 1, the code 110 is a manufacturing lot number associated with the manufacture of the semiconductor package 102.

The system 100 further includes an electronic device 112. As explained above, in examples, the electronic device 112 is a smartphone, although the scope of this disclosure encompasses other types of electronic devices as well, such as cameras, augmented reality eyewear, and notebook computers. In examples, the electronic device 112 has an optical sensor 204 (e.g., a camera) configured to view and/or capture images in static (e.g., photographs) or dynamic (e.g., video clip) formats. Using such an optical sensor 204, the electronic device 112 may view or capture static or dynamic images of the semiconductor package 102, and, more particularly, of the codes 106, 108, 110 marked on the semiconductor package 102. In examples, the optical sensor may capture an image in response to a user pressing a button on a chassis of the electronic device 112 or tapping an icon on a display of the electronic device 112.

The system 100 further includes a network 116 and a second electronic device 118. The network 116 is any suitable type of network, such as the Internet, a local area network (LAN), a wireless local area network (WLAN), a virtual private network (VPN), a personal area network (PAN), a wide area network (WAN), or a combination thereof. In some examples, the second electronic device 118 is a server, such as a server maintained, owned, or otherwise controlled by a designer or manufacturer of the semiconductor package 102. The scope of this disclosure, however, is not limited to servers maintained, owned, or otherwise controlled by a designer or manufacturer of the semiconductor package 102. In some examples, the second electronic device 118 is not a server and is instead a personal computer or other type of computing device. The electronic device 112 and the second electronic device 118 are configured to communicate with each other via the network 116. In examples, the electronic device 112 has a wireless connection to the network 116, and in other examples, the electronic device 112 has a wired connection to the network 116. In examples, the second electronic device 118 has a wireless connection to the network 116, and in other examples, the second electronic device 118 has a wired connection to the network 116.

In examples, the second electronic device 118 stores or has access to semiconductor package 102 information, such as information that is identifiable by one or more of the codes in the codes 106, 108, 110. For example, such information may be stored in databases 120 to which the second electronic device 118 has access. In examples, such information may be stored on the second electronic device 118. In examples, such information may be distributed among the second electronic device 118 and the databases 120. In examples, such information may be stored on a different device besides the second electronic device 118 and the device on which databases 120 are stored, and in yet other examples, such information may be distributed among multiple devices that may or may not include one or more of the second electronic device 118 and the device on which the databases 120 are stored. In examples, the databases 120 are distributed among multiple devices (e.g., servers), and in other examples, the databases 120 are stored on a common device.

In some examples, the aforementioned semiconductor package 102 information includes a name of the semiconductor package 102. The name of the semiconductor package 102 may be composed of alphabet letters, or the name may be an alphanumeric code, such as the semiconductor package identifier described above. In some examples, the information includes a description of one or more functions that the semiconductor package 102 is configured to perform. For example, if the semiconductor package 102 includes a buck converter, the description may include a statement that the semiconductor package 102 is configured to step down an input voltage to a lower output voltage, as well as specific electrical parameters associated with the buck converter. In some examples, the information includes specifications for the semiconductor package 102, such as a schematic block diagram of the contents of the semiconductor package 102, a pinout diagram of the semiconductor package 102, a circuit schematic of the semiconductor package 102, a datasheet for the semiconductor package 102, an erratum to such a datasheet, etc.

In some examples, the aforementioned semiconductor package 102 information may include a qualification report for the semiconductor package 102, which may describe reliability tests performed on the semiconductor package 102, including results from physical tests such as accelerated life tests, high-temperature tests, temperature cycling tests, electrostatic tests, etc. In some examples, the qualification report may include failure-in-time (FIT) data for the semiconductor package 102. In some examples, the information may include a statement as to the expected lifespan of the semiconductor package 102. In some examples, the information includes a moisture sensitivity level (MSL) of the semiconductor package 102, which indicates how long the part may be stored and absorb moisture from the environment prior to use. In some examples, the information includes a soft error rate (SER), which indicates a rate at which the semiconductor package 102 is known to produce errors in operation, such as incorrect signals or data provided on the conductive terminals 104. In examples, the information includes a Restriction of Hazardous Substances (RoHS) statement, which may include chemical safety information pertaining to RoHS regulations and compliance data pertaining to RoHS regulations. The RoHS statement may also include a description of one or more chemical elements present in the semiconductor package 102.

In some examples, the information may include a quality report that includes quality metrics based on known production problems with the semiconductor package 102. In examples, the information includes a description of tests to which the semiconductor package 102 was subjected during manufacture and results of those tests. In examples, the information includes a statement of the raw return rate of the semiconductor package 102, which indicates a percentage or ratio of semiconductor packages 102 that are perceived to be defective and returned to the manufacturer by purchasers. In examples, the information includes a product change noted (PCN) status, which is a description of design or manufacturing changes that may have been implemented in the semiconductor package 102 within the past five years, within the past two years, within the past one year, within the past six months, within the past three months, within the past one month, or since the date that the semiconductor package 102 was purchased. Other time frames are possible and are contemplated.

In some examples, the information includes a troubleshooting guide. For example, the troubleshooting guide may include a step-by-step process for solving problems that commonly arise with the semiconductor package 102. For instance, the troubleshooting guide may include a frequently-asked-questions (FAQ) guide for the semiconductor package 102. In some examples, the information may include responses provided to a user upon receiving one or more queries from the user. To facilitate the provision of such information, an interactive session may be initiated between the electronic device 112 and the second electronic device 118, for example in response to the exchange and verification of a security key(s) by one or both of the electronic devices 112, 118. In such interactive sessions, the second electronic device 118 may provide responses to queries in a deterministic manner. Alternatively, the second electronic device 118 may be an artificial intelligence (AI) machine trained using appropriate data sets and appropriate machine learning techniques to facilitate the provision of non-deterministic responses to received inputs (e.g., queries). Topics addressed by such a troubleshooting guide or interactive session may include programming of a semiconductor package 102 (e.g., for microcontrollers), soldering techniques (e.g., for soldering the conductive terminals 104 to a printed circuit board (PCB)), challenges caused by high currents flowing through the semiconductor package 102 (e.g., in power applications), challenges caused by mechanical damage to the semiconductor package 102, etc.

In some examples, the information may be provided interactively in the form of numerical responses to inputs, such as with a calculator. For instance, the information may include failure-in-time (FIT) calculations in response to one or more inputs that may be used to determine such calculations. For instance, the information may include a lifespan prediction of the semiconductor package 102 based on a temperature profile of the application in which the semiconductor package 102 is being used or is to be used. Such a temperature profile may indicate, for example, a temperature range to which the semiconductor package 102 may be subjected, times of day during which various temperatures may be applied to the semiconductor package 102, seasons during which the device housing the semiconductor package 102 may be used, etc. Such a temperature profile may then be used in tandem with historical performance data for other semiconductor packages similar or identical to the semiconductor package 102 to predict a lifespan of the semiconductor package 102. In examples, the information may include a power calculation that is able to determine energy dissipated by the semiconductor package 102 based on the type of the semiconductor package 102, known thermal properties of the semiconductor package 102, heat generated by the semiconductor package 102 based on an applied voltage and/or current, and other suitable and relevant factors.

The scope of this disclosure is not limited to the various examples of information provided above. These examples, along with variations on these examples and other types of information not expressly described, may be included in the scope of this disclosure.

The system 100 also includes an output device 114. The output device 114 may communicate with the electronic device 112 wirelessly or with a wired connection. In examples, the output device 114 is a display. In examples, the output device 114 is a speaker. In examples, the output device 114 is a printer. In examples, the output device 114 is a storage device, such as a hard drive, random access memory (RAM), or a server. In some examples, the output device 114 is omitted from the system 100, and information that is to be output is instead output using the electronic device 112, for example, using a display that is part of the electronic device 112.

Figure 2:
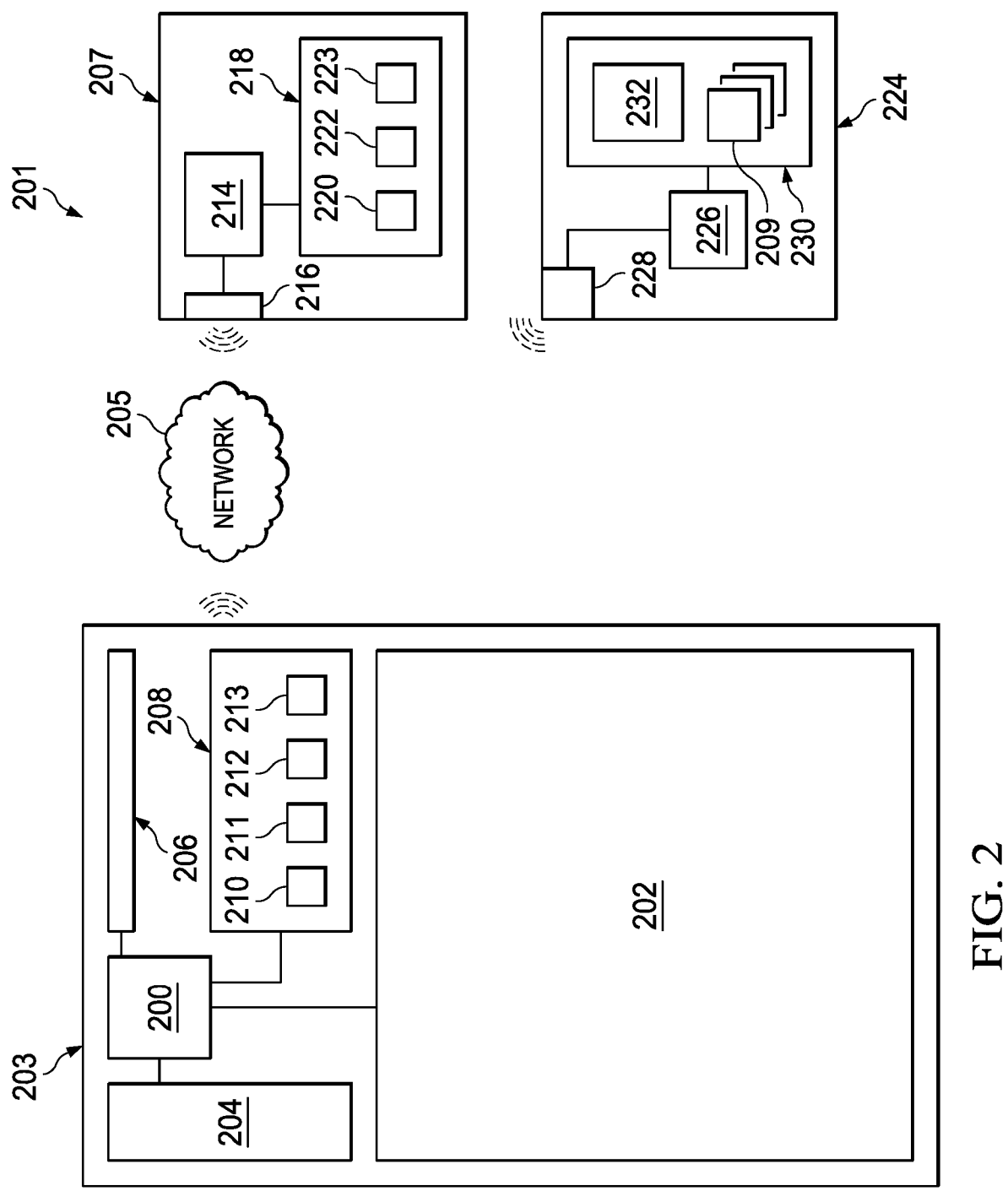
FIG. 2 is a schematic block diagram of a system for accessing semiconductor package information using images, in accordance with various examples.

The operation of the system 100 is explained below after a more detailed description of the components of the system 100 with respect to FIG. 2. FIG. 2 depicts a system 201 that is an example implementation of the system 100 of FIG. 1. More specifically, FIG. 2 depicts example components within an electronic device 203 (e.g., the electronic device 112), a second electronic device 207 (e.g., the electronic device 118), and an electronic device 224 that may store the databases 209 (e.g., databases 120) (FIG. 1). As shown in FIG. 2, the electronic device 203 may include a processor 200 (e.g., central processing unit (CPU)), which in some examples may be replaced by a microcontroller. The processor 200 couples to a display 202 that is viewable by a user of the electronic device 203. The processor 200 further couples to an optical sensor 204 (e.g., a camera) and a wireless transceiver 206 that facilitates the transmission and reception of wireless signals to and from a network 205 (e.g., network 116, such as the Internet) or other electronic devices (e.g., the second electronic device 207). The processor 200 may also couple to storage 208 (e.g., non-transitory computer-readable storage medium, such as volatile memory (e.g., random access memory (RAM)) or non-volatile memory (e.g., read-only memory (ROM))). In examples, the storage 208 stores various types of executable code and/or data. For instance, the storage 208 stores executable code 210, which, when executed by the processor 200, causes the processor 200 to perform some or all of the actions attributed herein to the electronic device 203 and/or to the processor 200. The storage 208 may store one or more tools 211. A tool 211 is executable code which, when executed by the processor 200, causes the processor 200 to perform specific functions that may not be provided by the executable code 210. For instance, a tool 211 may provide the processor 200 with optical character recognition (OCR) functionality with which the processor 200 may identify alphanumeric text or other symbols in images captured or viewed by the optical sensor 204.

In addition, the storage 208 may store a security key 212. In examples, the security key 212 is a unique identifier associated with the entity owning the semiconductor package 102. The security key 212 may be implemented on one or more electronic devices owned, leased, or otherwise controlled by the entity, such as on the electronic device 203. The security key 212 may accompany requests for information, such as proprietary or confidential information, pertaining to the semiconductor package 102, and the security key 212 may be verified prior to the provision of such information to the electronic device 203. In this way, proprietary or confidential information is provided in a controller manner to those who are entitled or authorized to view the information. In some examples, the security key 212 is hard-coded onto the electronic device 203 and cannot be altered. In examples, the security key 212 is removable from the electronic device 203 but cannot be stored to the electronic device 203 without complying with appropriate security conditions. In examples, the storage 208 may store data structures 213. The data structures 213 may include, for example, a data structure listing valid semiconductor package identifiers and a data structure listing valid manufacturing lot numbers for semiconductor packages, as described below.

Still referring to FIG. 2, in some examples, the second electronic device 207 is a server, such as a server owned, leased, maintained, or otherwise controlled by a designer or manufacturer of the semiconductor package 102. In some examples, the second electronic device 207 is a personal computer or other suitable type of computing device. In examples, the second electronic device 207 includes a processor 214 (e.g., a CPU, a microcontroller). The processor 214 couples to a network interface 216 and storage 218 ((e.g., non-transitory computer-readable storage medium, such as volatile memory (e.g., random access memory (RAM)) or non-volatile memory (e.g., read-only memory (ROM))). The network interface 216 may be a wireless or wired network interface that facilitates communication between the second electronic device 207 and the network 205, for example. The storage 218 stores executable code 220, which, when executed by the processor 214, causes the processor 214 to perform some or all of the actions ascribed herein to the second electronic device 207 and/or to the processor 214. The storage 218 may also include one or more tools 222. A tool 222 is executable code which, when executed by the processor 214, causes the processor 214 to perform specific functions that may not be provided by the executable code 220. For instance, a tool 222 may provide the processor 214 with OCR functionality with which the processor 214 may identify alphanumeric text or other symbols in images captured by the optical sensor 204 and transmitted by the electronic device 203 to the second electronic device 207. The storage 218 may also include one or more databases 223, which may store the semiconductor package 102 information, described above.

In some examples, the electronic device 224 is another server, although the electronic device 224 may also be a personal computer or other suitable type of computing device. The electronic device 224 includes a processor 226 (e.g., a CPU, a microcontroller). The processor 226 couples to a network interface 228, which facilitates wired or wireless communications, for example with the network 205. In some examples, the electronic device 224 communicates directly (e.g., via a wired or wireless connection) with the second electronic device 207, and thus the network interfaces 228 and 216 may couple to each other. In examples, the processor 226 couples to storage 230, which may store executable code 232 and databases 209 (e.g., databases 120). The executable code 232, when executed by the processor 226, causes the processor 226 to perform some or all of the actions attributed herein to the electronic device 224 and/or to the processor 226. The databases 209 may include semiconductor package 102 information, such as the information described in detail above. The databases 209 may also include a data structure cross-referencing security keys, semiconductor package identifiers, manufacturing lot numbers, and any other suitable information that may be helpful to the processor 226 and/or the processor 214 in determining whether the semiconductor package 102 information should be provided to an entity and, if so, which information should be provided to the entity.

Figure 3:
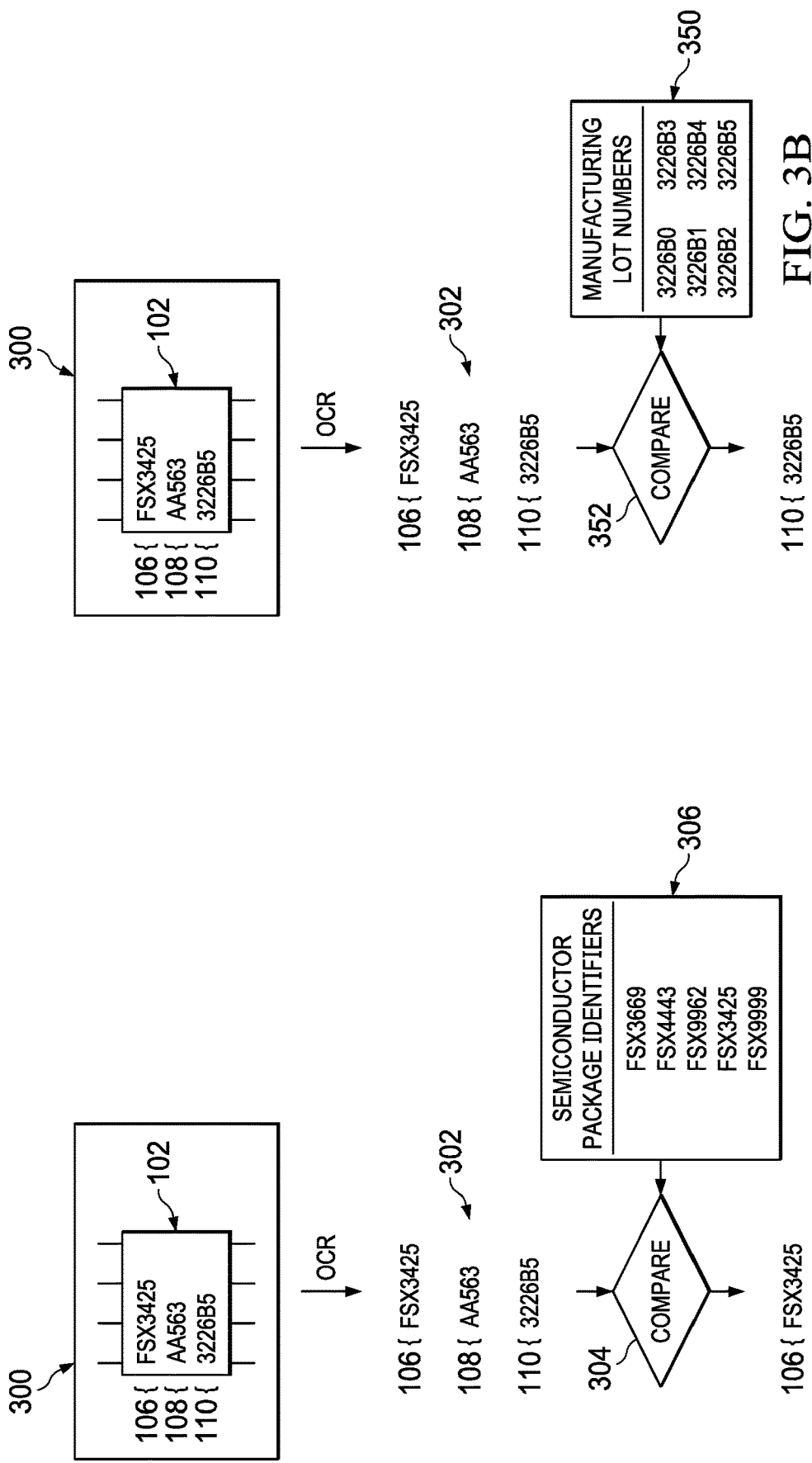
FIGS. 3A and 3B are conceptual flow diagrams of semiconductor package identifier and manufacturing lot number identification techniques, in accordance with various examples.
Figure 4:
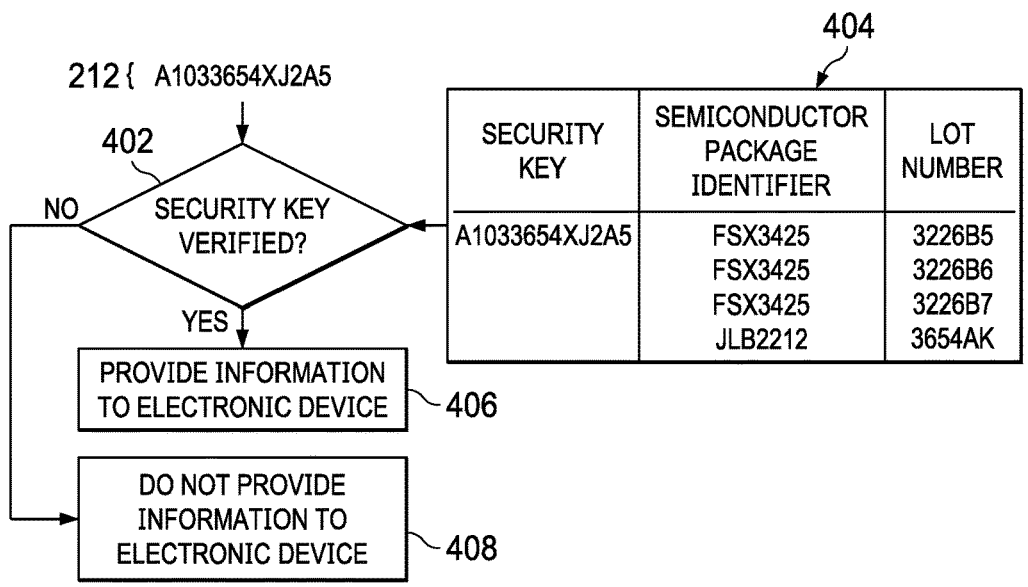
FIG. 4 is a conceptual flow diagram of a security key verification technique, in accordance with various examples.
Figure 5:
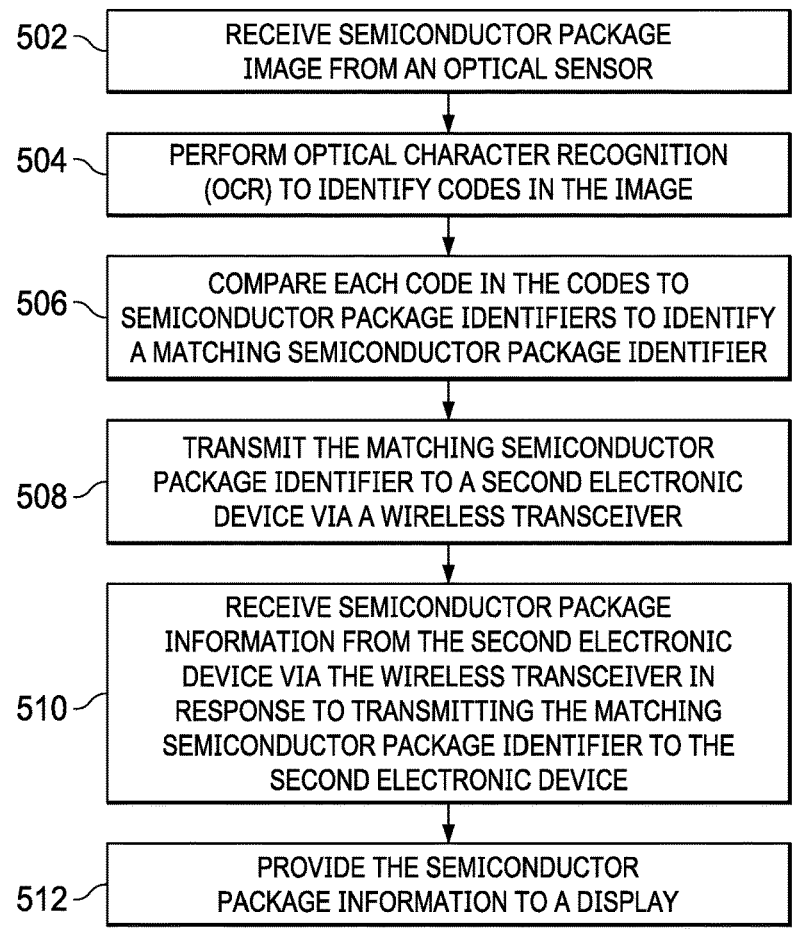
FIG. 5 is a flow diagram of a method for accessing semiconductor package information using a semiconductor package image, in accordance with various examples.

FIG. 3A is a conceptual flow diagram illustrating the identification of a semiconductor package identifier among the codes 106, 108, 110, in accordance with various examples. FIG. 3B is a conceptual flow diagram illustrating the identification of a manufacturing lot number among the codes 106, 108, 110, in accordance with various examples. FIG. 4 is a conceptual flow diagram illustrating the verification of a security key stored on the electronic device 112, in accordance with various examples. FIG. 5 is a flow diagram of a method 500, which is an example operation for accessing semiconductor package 102 information using a semiconductor package 102 image. In examples, the techniques of FIGS. 3A-5 may be performed by the electronic device 112, and, more specifically, by the processor 200 of the electronic device 112. The operation of the system 100 is now described with concurrent reference to FIGS. 1-5.

The method 500 begins by receiving, by the processor 200, a semiconductor package 102 image from the optical sensor 204 (502), including the codes 106, 108, 110. As explained above, the image may be captured using the optical sensor 204 and stored (e.g., on storage 208). Alternatively, the optical sensor 204 may be trained on the semiconductor package 102 (including the codes 106, 108, 110) without capturing and storing an image. In both examples, the processor 200 has access to an image, whether captured and stored or not, from which the codes 106, 108, 110 may be identified.

Accordingly, the method 500 next includes the processor 200 performing OCR (or other suitable technique) to identify the codes 106, 108, 110 in the image (504). FIG. 3A includes a conceptual illustration of (504), in which an image 300 of the semiconductor package 102 including the codes 106, 108, 110 is received by the processor 200. OCR is performed on the image 300, resulting in the identification of the codes 106, 108, 110, as numeral 302 depicts. The processor 200 may use a tool 211 to perform the OCR.

The method 500 subsequently includes the processor 200 comparing each code in the codes 106, 108, 110 to semiconductor package identifiers to identify a matching semiconductor package identifier (506). Numeral 304 in FIG. 3 indicates this comparison between the codes 106, 108, 110 and a data structure 306 listing valid semiconductor package identifiers. The data structure 306 is, for example, one of the data structures 213 described above. As FIG. 3 indicates, the comparison results in code 106 being identified as a semiconductor package identifier, because the code 106 matches one of the valid semiconductor package identifiers in the data structure 306.

The method 500 next includes transmitting the matching semiconductor package identifier to a second electronic device via a wireless transceiver (508). For example, the processor 200 may transmit the code 106 to the second electronic device 118 via the wireless transceiver 206 and the network 116. The processor 214 in the second electronic device 118 may use the code 106, which is a semiconductor package identifier corresponding to the semiconductor package 102, to identify semiconductor package 102 information. For example, the processor 214 may use the code 106 to identify and access semiconductor package 102 information from, e.g., the one or more databases 223 and/or the one or more databases 120 stored on the electronic device 224 and accessed via, e.g., the network 116. The processor 214 may collect and transmit such information to the electronic device 112 via the network 116.

Accordingly, the method 500 includes receiving the semiconductor package 102 information from the second electronic device 118 via the wireless transceiver 206 in response to transmitting the code 106 to the second electronic device 118 (510). The method 500 then includes providing the semiconductor package 102 information to the display 202 or to an output device 114 (512), which may be configured to display or otherwise output the semiconductor package information. The information may be provided in a variety of formats. For example, the processor 200 may display the information (e.g., a pinout diagram) on the display 202 as an overlay on top of a captured and stored semiconductor package 102 image, such as the image 300. In examples, the processor 200 may display the information (e.g., pinout diagram) on the display 202 as an overlay on top of a semiconductor package 102 image that has not been captured and stored, e.g., an image that is being dynamically updated in real-time on the display 202 as a result of training the optical sensor 204 on the semiconductor package 102. In examples, the processor 200 may output the semiconductor package 102 information in the form of charts, graphs, tables, text, images, audio/video clips, responses to queries in interactive sessions, and so on. All such variations are included in the scope of this disclosure.

In some examples, the processor 200 may transmit to the second electronic device 118 a code other than the semiconductor package identifier (e.g., code 106). For example, the processor 200 may identify a manufacturing lot number among the codes 106, 108, 110 and may transmit the manufacturing lot number in addition to, or in lieu of, the semiconductor package identifier. FIG. 3B is a conceptual flow diagram illustrating an example manufacturing lot number identification technique that may be performed by the processor 200. As shown, the image 300 includes the semiconductor package 102, which, in turn, includes the codes 106, 108, 110. The processor 200 may perform OCR on the image 300, for example using a suitable tool 211, resulting in the identification of the codes 106, 108, 110, as numeral 302 depicts. The codes 106, 108, 110 may be compared to a data structure 350 (e.g., one of the data structures 213 in FIG. 2) that includes a group of valid manufacturing lot numbers, as numeral 352 depicts. Upon performing this comparison, the processor 200 identifies the code 110 as a manufacturing lot number. As explained, when transmitting a request for semiconductor package 102 information, the processor 200 may include the code 110 in addition to, or in lieu of, code 106. Other, similar techniques may be used to transmit other codes (e.g., code 108) in lieu of, or in addition to, the codes 106, 110. Upon receipt of the code 110, the processor 214 accesses information corresponding to the code 110 (e.g., the manufacturing lot number). The processor 214 may then provide the information to the electronic device 112.

In some examples, the semiconductor package 102 information may be proprietary or confidential. For instance, it may be desirable to provide the information solely to entities that are known purchasers of the semiconductor package 102. Accordingly, when requesting the information from the second electronic device 118, the processor 200 may transmit the aforementioned security key 212 to the second electronic device 118. In examples, the processor 200 transmits the security key 212 to the second electronic device 118 in tandem with the semiconductor package identifier (e.g., code 106), the lot number (e.g., code 110), or other code (e.g., code 108). In examples, the processor 200 transmits the security key 212 alone. FIG. 4 is a conceptual flow diagram of an example security key verification technique that the processor 214 may perform. In examples, a security key 212 is received by the second electronic device 118 from the electronic device 112. Upon receipt of the security key 212, the processor 214 may compare the security key 212 to a data structure 404 (e.g., stored on storage 218 as part of the databases 223) that cross-references security keys with semiconductor package identifiers and manufacturing lot numbers. In response to the security key 212 matching an entry in the data structure 404 as numeral 402 indicates, the processor 214 identifies which semiconductor package identifier(s) correspond to the security key 212 and which manufacturing lot number(s) correspond to the security key 212. The processor 214 then collects information associated with the identified semiconductor package identifier(s) and manufacturing lot number(s) and provides that information to the electronic device 112 via the network 116 (406). The processor 214 may collect such information from, e.g., the databases 223 or the databases 120. If the security key is not verified, the information may not be provided (408).

The foregoing description assumes that the techniques of FIGS. 3A and 3B are performed by the electronic device 112. However, in examples, the techniques of FIGS. 3A and 3B may instead be performed on the second electronic device 118. For example, the processor 200 may capture an image using the optical sensor 204 and may transmit the image (e.g., image 300) to the second electronic device 118 via the network 116. Upon receiving the image, the processor 214 may perform the techniques described above with respect to FIGS. 3A and 3B, for example, using a suitable tool 222 (e.g., an OCR tool). Upon identifying a semiconductor package identifier, a manufacturing lot number, or other suitable code, the processor 214 may locate semiconductor package 102 information and provide the information to the electronic device 112 via the network 116. In examples, the processor 214 may locate and/or provide this information to the electronic device 112 in response to the verification of a security key, such as the security key 212 described above with respect to FIG. 4. In some examples, the processor 200 may transmit one or more of the image 300, the codes 106, 108, 110, the semiconductor package identifier, and a manufacturing lot number to the second electronic device 118.

Figure 6:
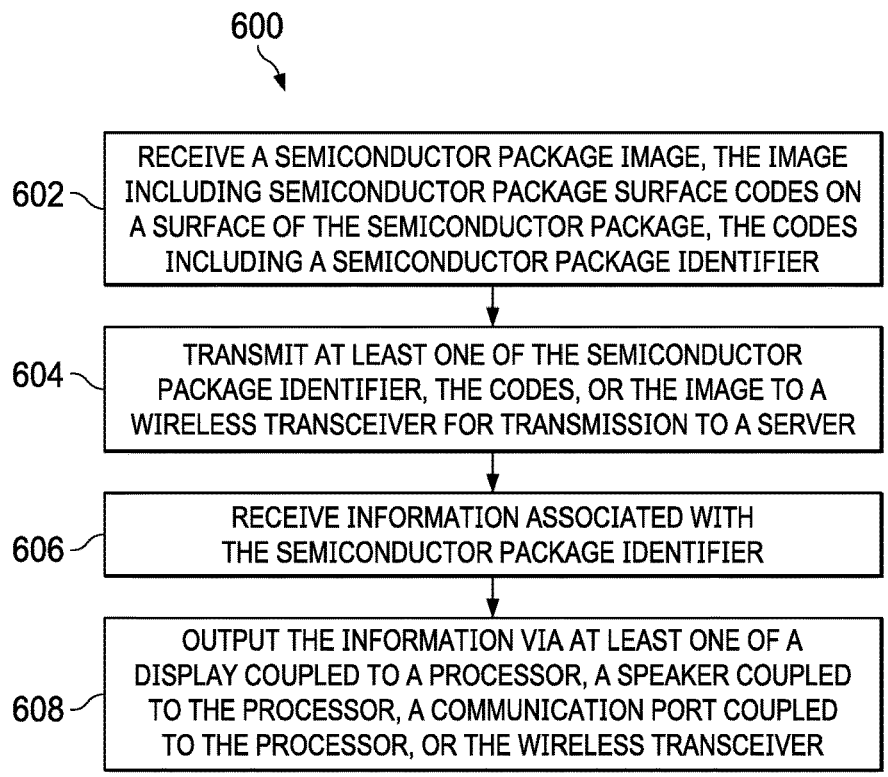
FIG. 6 is a flow diagram of a method for accessing semiconductor package information using a semiconductor package image, in accordance with various examples.

FIG. 6 is a flow diagram of a method 600 for accessing semiconductor package 102 information, in accordance with various examples. Both the methods 500, 600 may be performed by the processor 200 of the electronic device 112. However, the method 600 differs from the method 500 at least because the method 600 incorporates some of the examples described above in which codes may be identified in a semiconductor package 102 image by the electronic device 112 or by the second electronic device 118. The method 600 begins by receiving a semiconductor package 102 image (e.g. image 300), the image including codes (e.g., codes 106, 108, 110) on a surface of the semiconductor package 102, and the codes including a semiconductor package identifier (e.g., code 106) (602). The method 600 then includes transmitting at least one of the semiconductor package identifier, the codes, or the image to a wireless transceiver for transmission to a server (604). For example, the processor 200, upon capturing the image 300 using the optical sensor 204, may identify the semiconductor package identifier using the technique of FIG. 3A and then may transmit the semiconductor package identifier to the second electronic device 118. In other examples, the processor 200, upon capturing the image 300, may identify the codes 106, 108, 110 using the technique of FIG. 3A and may transmit the semiconductor package identifier to the second electronic device 118. Although not expressly depicted in FIG. 6, in some examples, the processor 200 may identify a code other than the semiconductor package identifier among the codes 106, 108, 110—such as a manufacturing lot number (e.g., code 110)—and may transmit the identified code to the second electronic device 118. In yet other examples, the processor 200 may transmit the image to the second electronic device 118 so that the processor 214 may perform code identification techniques using one or more tools 222 to identify a suitable code (e.g., semiconductor package identifier, manufacturing lot number) and to use the identified code to access semiconductor package 102 information and associated with the semiconductor package identifier.

The method 600 then includes receiving from the wireless transceiver information associated with the semiconductor package identifier (606) and outputting the information via at least one of a display coupled to the processor, a speaker coupled to the processor, or the wireless transceiver (608). Accordingly, the processor 200 may receive the information via the wireless transceiver 206 and may output the information in any suitable format to the display 202, a speaker (e.g., output device 114 in FIG. 1) coupled to the processor 200, and/or to the wireless transceiver 206 for transmission to another electronic device on the network 116.

Figure 7:
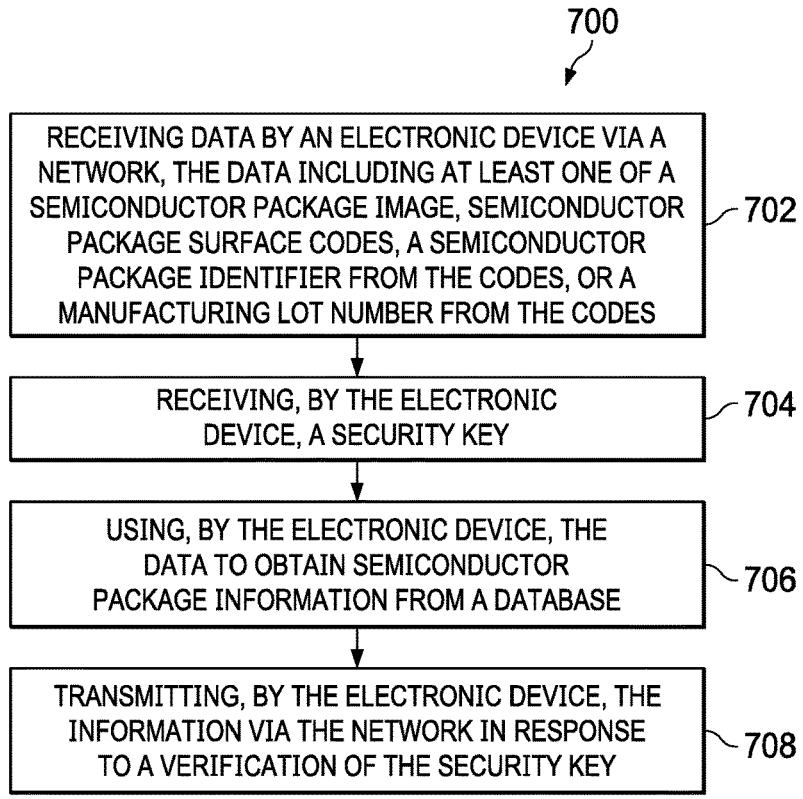
FIG. 7 is a flow diagram of a method for providing semiconductor package information using a semiconductor package image, in accordance with various examples.

FIG. 7 is a flow diagram of a method 700 for providing semiconductor package information, in accordance with various examples. In examples, the processor 214 may perform the method 700. The method 700 begins by receiving data by an electronic device via a network, the data including at least one of a semiconductor package image, semiconductor package surface codes printed on a surface of the semiconductor package, a semiconductor package identifier from the codes, or a manufacturing lot number from the codes (702). For example, the processor 214 may receive the image 300 from the electronic device 112 via the network 116. In examples, the processor 214 may receive the codes 106, 108, 110 from the electronic device 112, in which case the processor 200 will already have performed OCR as described above. In examples, the processor 214 may receive one of the codes 106, 108, 110, such as the semiconductor package identifier (e.g., code 106), or the manufacturing lot number (e.g., code 110), in which case the processor 200 will already have performed OCR as described above. The method 700 then includes receiving, by the electronic device, a security key (704). For example, the processor 214 may receive the security key 212 (FIG. 4) from the electronic device 112. The method 700 then includes using, by the electronic device, the data to obtain semiconductor package information from a database (706). For example, the processor 214 may use the semiconductor package identifier (e.g., code 106) or the manufacturing lot number (e.g., code 110) to locate and access information pertaining to these codes (e.g., from the one or more databases 223, 120). The method 700 subsequently includes transmitting, by the electronic device, the information via the network in response to a verification of the security key (708). For example, the processor 214 may verify the security key 212 received from the electronic device 112 as shown in FIG. 4, and, in response to the verification, the processor 214 may provide the semiconductor package 102 information to the electronic device 112 via the network 116. The electronic device 112 may then display or otherwise output the semiconductor package 102 information in any suitable manner, for example, as described above.

The above discussion is meant to be illustrative of the principles and various examples of the present disclosure. Numerous variations and modifications will become apparent to those skilled in the art when the above disclosure is fully appreciated. The following claims embrace all such variations and modifications.

In the foregoing discussion and in the claims, the term "couple" or "couples" means either an indirect or direct connection. Thus, if a first device couples to a second device, that connection may be through a direct connection or through an indirect connection via other devices and connections. Similarly, a device that couples between a first component or location and a second component or location may be through a direct connection or through an indirect connection via other devices and connections. The term "couple" may cover connections, communications, or signal paths that enable a functional relationship consistent with the description of the present disclosure. For example, if device A generates a signal to control device B to perform an action, in a first example device A couples to device B, or in a second example device A couples to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

What is claimed is:

1. An electronic device, comprising:
an optical sensor configured to capture a semiconductor package image, the semiconductor package image including semiconductor package surface codes;
a display;
a wireless transceiver;
storage; and
a processor coupled to the optical sensor, to the display, to the wireless transceiver, and to the storage, the processor configured to:
receive the semiconductor package image from the optical sensor;
perform optical character recognition (OCR) to identify the semiconductor package surface codes in the semiconductor package image;
retrieve semiconductor package identifiers from the storage;

compare the semiconductor package surface codes to the semiconductor package identifiers to identify a matching semiconductor package identifier of the semiconductor package identifiers;

transmit, to a second electronic device, the matching semiconductor package identifier via the wireless transceiver;

transmit, to the second electronic device via the wireless transceiver, a security key;

receive, from the second electronic device, semiconductor package information via the wireless transceiver after transmitting the matching semiconductor package identifier and responsive to the security key, wherein the semiconductor package information comprises at least one of a semiconductor package function, a schematic block diagram, a circuit schematic, a datasheet, a qualification report, a quality report, a troubleshooting guide, calculations, or a semiconductor package pin description; and provide the semiconductor package information to the display;

wherein the display is configured to display the semiconductor package information.

2. The electronic device of claim 1, wherein the electronic device is a smartphone.

3. The electronic device of claim 1, wherein the processor is configured to cause the display to display the semiconductor package information as an overlay on the semiconductor package image.

4. The electronic device of claim 1, wherein the optical sensor is configured to capture the semiconductor package image in response to the optical sensor being trained on the semiconductor package.

5. The electronic device of claim 1, wherein the optical sensor is configured to receive the semiconductor package image in response to a user tapping the display of the electronic device.

6. The electronic device of claim 1, wherein the semiconductor package surface codes comprise a model number or a lot number.

7. The electronic device of claim 1, wherein the semiconductor package surface codes are printed on a surface of a semiconductor package.

8. A method comprising:

capturing, by an optical sensor, a semiconductor package image, the semiconductor package image including semiconductor package surface codes;

receiving, by at least one processor, the semiconductor package image from the optical sensor;

performing, by the at least one processor, optical character recognition (OCR) to identify the semiconductor package surface codes in the semiconductor package image;

retrieving, by the at least one processor from storage, semiconductor package identifiers from the storage;

comparing, by the at least one processor, the semiconductor package surface codes to the semiconductor package identifiers to identify a matching semiconductor package identifier of the semiconductor package identifiers;

transmitting, by the at least one processor to an electronic device, the matching semiconductor package identifier;

transmitting, by the at least one processor to the electronic device, a security key;

receiving, by the at least one processor from the electronic device, semiconductor package information after transmitting the matching semiconductor package identifier and responsive to the security key, wherein the semiconductor package information comprises at least one of a semiconductor package function, a schematic block diagram, a circuit schematic, a data sheet, a qualification report, a quality report, a troubleshooting guide, calculations, or a semiconductor package pin description; and displaying, by a display, the semiconductor package information.

9. The method of claim 8, further comprising displaying, by the display, the semiconductor package information as an overlay on the semiconductor package image.

10. The method of claim 8, wherein the semiconductor package surface codes comprise a model number or a lot number.

11. The method of claim 8, wherein the semiconductor package surface codes are printed on a surface of a semiconductor package.

12. A non-transitory computer-readable storage medium storing executable code which, when executed by a processor, causes the processor to:

obtain a semiconductor package image including semiconductor package surface codes;

perform optical character recognition (OCR) to identify the semiconductor package surface codes in the semiconductor package image;

obtain semiconductor package identifiers;

compare the semiconductor package surface codes to the semiconductor package identifiers to identify a matching semiconductor package identifier of the semiconductor package identifiers;

transmit, to an electronic device the matching semiconductor package identifier;

transmit, to the electronic device, a security key;

receive, from the electronic device, semiconductor package information after transmitting the matching semiconductor package identifier and responsive to the security key, wherein the semiconductor package information comprises at least one of a semiconductor package function, a schematic block diagram, a circuit schematic, a datasheet, a qualification report, a quality report, a troubleshooting guide, calculations, or a semiconductor package pin description; and instruct a display to display the semiconductor package information.

13. The non-transitory computer-readable storage medium of claim 12, wherein the executable code causes the processor to instruct the display to display the semiconductor package information as an overlay on the semiconductor package image.

14. The non-transitory computer-readable storage medium of claim 12, wherein the semiconductor package surface codes are printed on a surface of a semiconductor package.

* * * * *